(12) United States Patent
Ulrich et al.

(10) Patent No.: US 7,398,514 B2
(45) Date of Patent: Jul. 8, 2008

(54) TEST AUTOMATION STACK LAYERING

(75) Inventors: Adam M. Ulrich, Kent, WA (US); Michael D. Gallacher, Bothell, WA (US); Michael J. Hunter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 582 days.

(21) Appl. No.: 10/953,402

(22) Filed: Sep. 29, 2004

(65) Prior Publication Data

US 2006/0070035 A1    Mar. 30, 2006

(51) Int. Cl.
*G06F 9/44* (2006.01)
(52) U.S. Cl. ..................................... 717/124
(58) Field of Classification Search ......... 717/124–126, 717/131, 162–163
See application file for complete search history.

(56) References Cited

U.S. PATENT DOCUMENTS

| | | | |
|---|---|---|---|
| 5,781,720 A * | 7/1998 | Parker et al. .................. 714/38 |
| 6,023,580 A * | 2/2000 | Sifter .......................... 717/124 |
| 6,449,744 B1 * | 9/2002 | Hansen ........................ 714/738 |
| 6,986,125 B2 * | 1/2006 | Apuzzo et al. ............... 717/124 |
| 2003/0028856 A1 | 2/2003 | Apuzzo et al. |
| 2003/0070120 A1 | 4/2003 | Michael et al. ............... 714/38 |
| 2004/0133881 A1 * | 7/2004 | Chamberlain et al. ........ 717/125 |

FOREIGN PATENT DOCUMENTS

WO    WO 03038550 A2    5/2003

OTHER PUBLICATIONS

Torre et al. "Model Generation of Test Logic for Macrocell Based Designs", 1996, IEEE Computer Society Press, pp. 1-6.*

Kung, et al. "Developing an Object-Oriented software Testing and Maintenance Environment", Oct. 1995, ACM, vol. 38 Issue 10, pp. 75-86.*

Allott, S.K., "Automate Your Test-You Won't Regress It!", *Seventeenth Annual Pacific Northwest Software Quality Conference*, Oct. 12-13, 1999, 135-157.

Chang, L. et al., "Using Application States in Software Testing", *International Conference on Software Engineering*, 2000, 776.

Dooley, .W., "Test Automation, A Cost Effective and Reliable Alternative to Labor", *Proceedings of the Technical Program, SMTA International*, Sep. 30-Oct. 4, 2001, 105-108.

Fecko, M.A. et al., "Lessons Learned from Automating Tests for an Operations Support System", *Software-Practice and Experience*, 2002, 32, 1485-1506.

(Continued)

*Primary Examiner*—Wei Y. Zhen
*Assistant Examiner*—Anna Deng
(74) *Attorney, Agent, or Firm*—Woodcock Washburn LLP (57) ABSTRACT

Separation of aspects of automated testing into architectural layers enables automated testing to occur sooner and faster and to provide more comprehensive testing. A physical layer provides an object model over the user interface of an application. A logical layer provides an object model around the functions of an application. A test case executor may execute a test case. A data manager may ensure variability in test data. A behavior manager may determine execution details appropriate for a particular test case. A verification manager may perform the verification processing after the test case has executed.

25 Claims, 4 Drawing Sheets

OTHER PUBLICATIONS

Gascoyne, S., "Productivity Improvements in Software Testing with Test Automation", *Electronic Engineering*, 2000, 65-66.

Giaccone, F. et al., "Test and Debug of Device/Process Control Code", *IBM Technical Disclosure Bulletin*, 1976, 609-611.

Hirt, E., "Protest", *Proceedings of the 4th Conference on Quality Engineering in Software Technology and VDE-ITG Workshop on Testing Non-Functional Software-Requirements*, Sep. 13-15, 2000, Nuremberg, Germany, 278-289.

Martin, C.E. et al., "Test Development and Test Automation for the PacketStar® PSAX Product", *Bell Labs Technical Journal*, 2002, 7(1), 183-195.

Magalhaes, G.R. et al., "A tool for Test Automation with Support for Remote Tests", *Midwest Symposium on Circuits & Systems*, 2000, 343-346.

Pfifferling, F., "Test Automation: Benefits and Pitfalls", *IEEE Intercon Technical Program Papers*, 1973, 7(8), 3 pages.

Sabbatini, E. et al., "Automating Test by Adding Formal Specification: An Experience for Database Bound Applications", *Advances in Engineering Software*, 1999, 30, 885-890.

\* cited by examiner

TEST AUTOMATION STACK LAYERING

CROSS-REFERENCE TO RELATED APPLICATIONS

This application is related to U.S. patent application Ser. No. 10/953,238, entitled "System for Selecting Test Case Execution Behaviors for Reproducible Test Automation," filed herewith on Sep. 29, 2004 and U.S. patent application Ser. No. 10/953,437, entitled "Automated Test Case Verification That Is Loosely Coupled With Respect To Automated Test Case Execution," filed herewith on Sep. 29, 2004.

FIELD OF THE INVENTION

The invention relates to software testing and in particular to automated software testing using a layered architecture.

BACKGROUND OF THE INVENTION

The major stages in the life cycle of software development are the design phase, the coding phase, the code complete phase, the alpha phase, the beta phase, and finally, release to market. During the design phase, the customer problems the software product will address and the functionality of the software product is defined. Typically, the completion of the functional specification marks the end of the design phase. The coding phase may already have begun. The code complete phase is reached when the code has been written but is not necessarily debugged. The alpha phase marks the point in time when the product is stable; that is, most of the major bugs have been found. In the beta phase, the product is ideally free of all major bugs; the only bugs remaining should be essentially harmless. When the product passes a final quality assurance checklist, it is ready for release to market.

As no one wants software that does not work, testing is an important part of the life cycle and can span several phases. Software testing involves devising a test case (or, more likely, a set of test cases), running the software with the test case as input, and checking that the performance of the software with the test case as input yields the expected results. Software testing can be conducted manually by humans or programmatically, referred to as automated software testing. Ideally, testing of the software should begin as soon as possible in the life cycle of the software. Generally, however, the software cannot be tested at all until the design phase has been completed, because until the design phase is complete, expected results cannot be determined. Typically, during the coding phase, the developer manually tests his code as he writes it. Automated software testing usually cannot begin until far later in the development process.

Sometimes, the only testing that is conducted is done by the developer who manually tests as he codes. A developer who tests his own work, however, is likely to overlook bugs that someone not so emotionally invested in the code will find. Furthermore, the scope of the developer's testing is typically limited to the functionality of his code and integration of his code with a limited number of other software applications.

To address these shortcomings, many software development houses have a separate software testing group that also tests the software, often using at least partially-automated testing techniques. Typically, the testing group tests complex interactions across features and across applications by writing and running test cases. It is generally agreed that involving the testing group early in the product life cycle, even as early as the design phase, reaps many benefits, including identification of inconsistencies in the functional specification, identification of hard-to-test areas and others. In general, however, the effort required to keep each test case current in the face of continued changes in feature definition, implementation and user interface (UI) tuning renders this approach impractical. Hence, writing and running test cases is typically a hurried matter that occurs at the tail end of product development. Testing and in particular, automated testing, thus tends to be perpetually behind the curve. It would be helpful if there were a way to write test cases and employ automated testing as soon as possible in the life cycle of a software product, ideally during the design phase.

Development of a suite of test cases is a challenge whenever it occurs. To test a specific feature of an application, numerous sets of tests must be written. For example, an application may permit many modes of interaction with a feature: via a mouse, keyboard, digitizer, accessibility software, programmatically, and so on. Therefore, to provide a comprehensive test for the feature, a suite of tests should include a set of tests interacting with the feature via the mouse (typing text just like a user might); one set interacting with the feature via keyboard, one set interacting with the feature via digitizer, one set interacting with the feature via accessibility software to invoke default actions and otherwise mimic an accessibility application, one set interacting with the feature via the application's coding model, and so on. It would be helpful if there were a way to make sure that the suite of test cases produced provided a comprehensive test of the feature or application and further, to decrease the total number of test cases that must be written to provide that comprehensive test.

Furthermore, much or all of the logic in each of these sets of test is identical to the logic in the other sets of tests and typically, much or all of the verification of results processing is identical as well. Hence, many tests are identical or very nearly so, merely varying execution options. For example, for all the multiple forms of input described above, the expected results are likely identical. Hence, writing a test case for each of these input sources typically requires writing a separate method for executing the test for each of the input sources, and duplicating most of the rest of the test script. Writing the same test over and over again with minor variations is tedious and time-consuming. It would be helpful if there were a way to eliminate or significantly reduce this duplicative coding and to reduce the total number of test cases that must be written.

Code written to determine if the actual results of running the test case coincide with the expected results (called verification of results, or verification) is often included within the test case. Changing the details of a particular result verification or adding new result verification typically requires the modification of each test case. It would be helpful if verification code were separate from the test case, making the test case easier to understand, and the verification code easier to reuse and to maintain.

Execution details are often hard-coded into the test case, requiring the design phase to be complete before the test case is written. It would be helpful if there were a way to define test cases in terms of user actions rather than in terms of specific execution details so that test cases could be written earlier in the software development life cycle.

Changes made to execution details and verification after the test cases are written typically requires a massive maintenance effort in which many test cases must be found and modified. It would be helpful if maintenance efforts could be localized so that modifications could be made in one place instead of in each test case.

SUMMARY OF THE INVENTION

An automated test system utilizing an automation stack may enable test cases to be written and compiled as early as the design phase of software development. The test cases may be executed as soon as the code implementing the feature to be tested is written.

An automated test system may include one or more of: a test case executor, a data manager, a behavior manager and a databank of behaviors, a verification manager, and an automation stack. A test case executor may execute a test case. A data manager may ensure variability in testing data. A behavior manager may determine execution details appropriate for a particular test case. A verification manager may perform the verification processing after the test case has executed. An automation stack may provide an architecture that enables the separation of details of test case execution into layers or sets of objects. An automation stack may include a logical layer and a physical layer, while a test case layer may be built on top of the logical layer. A test case may be defined in terms of features or user actions rather than in terms of specific execution details/user interface details thus enabling test cases to be written earlier in the software development life cycle and enabling changes to execution details and user interface details to be decoupled and isolated from test case details.

Test case execution and test case verification may be decoupled via separation into execution behavior and verification layers. Verification of results processing may be separate from the test case, thereby enabling the test case to be more understandable and to facilitate re-use of the verification code. Maintenance may be simplified by localization to a single point of change within the automation stack or within the verification or behavior layers, thus enabling the test case to be essentially maintenance-free.

Separating each of the details of how the various steps in a test case is executed into its own layer or set of objects allows each of these factors to vary independently. Each layer may introduce variability over the layer or layers below it, thus reducing the number of tests that must be written. For example, one test written to a higher layer that is run five times may have the same efficacy as five, ten or even fifty tests written to a lower layer. The organization into layers enables the tests themselves to be simpler and easier to understand, and may reduce the amount of time it takes to write a test case in addition to reducing the number of test cases that must be written to cover a set of execution paths.

A logical layer may provide a view of the application based on the actions that can be taken (for example, the action of "open a document") rather than the specific details of the user interface (for example, specific details such as "open the File menu and click Open, wait for the File Open dialog box to open, enter the name of the file to open, press OK, wait for the File Open dialog box to disappear, wait for the application to open the document and be ready for further input"). The logical layer may also abstract away as much knowledge as practical of the user interface, so that tests written to this layer do not need to be edited when the user interface changes. The logical layer may also introduce variability over the various physical methods of execution, so that a single test case written to this layer can be executed via the mouse or the keyboard, etc. without any changes to the test case.

A physical layer insulates tests from the highly specific details of communicating with a particular control, including details such as the identification code of a particular control, and the way the control is accessed (via mouse, keyboard, accessibility, tablet, etc). The physical layer may provide an object model around the application's user interface so that the test has strongly typed access to the user interface. The physical layer may also enable the execution method to be defined independently of the control so that just a single object model is required regardless of the number of execution methods.

A verification layer may be independent of and isolated from direct contact to the test cases, so that changes to verification details do not require any changes to the tests.

An execution behavior layer may be independent of and isolated from direct contact to the test cases so that changes to which execution behaviors are available or changes to the implementation of any specific behavior can be made with minimal or no changes to the test cases.

A data management layer may be used by test cases when the test cases require test data. The data management layer may provide a centralized store of all test data and allow changes to be made to the test data or the manner in which the test data is generated requiring minimal or no changes to the test cases.

Each layer may provide (direct) access to the layer below it but a test case can make calls to any layer as necessary. A test case that explicitly verifies menu behavior, for example, may use the logical layer to create a drawing that contains various shapes, and then use the physical layer to directly manipulate the menus. The test case may go below to the physical layer to the operating system services for verification of results. Thus a test case may utilize the full power of the higher layers while also utilizing the full control provided by the lower layers.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

One challenge in the development of test cases is to prepare a set of test cases that provides a comprehensive test. A large percentage of test cases exercises a small percentage of the user actions under test. To understand why this may happen, consider that an individual operation can usually be executed via several different user actions. For example, creating a new document in Microsoft Word can be done by:

Clicking the File menu, clicking the New submenu, then clicking the New Document menu item.

Typing Alt+F to invoke the File menu, typing N to invoke the New submenu, then typing N to invoke the New Document menu item.

Typing Alt to invoke the main menu repeatedly pressing the left arrow key until the File menu is selected, repeatedly pressing the down arrow key until the New submenu item is selected, pressing the left arrow key a single time to expand the New submenu, repeatedly pressing the down arrow key until the New Document menu item is selected, then pressing Enter to invoke the New Document menu item.

Invoking the New Document menu item via accessibility APIs.
   Clicking the New Document toolbar button.
   Invoking the New Document toolbar button via accessibility APIs.
   Typing Ctl+N.
   Executing the scripting object model method that creates a new document.

Each of these different ways to open a document, each one potentially invoking a different code path, should be tested. In accordance with some embodiments of the invention, all possible execution paths and data values are exercised.

Because multiple paths of execution are commonplace, verification processing is often duplicated in many of the test cases in a set. Often, the verification code will be copy-and-pasted into each test case. In addition to being tedious and time-consuming, a maintenance problem is thereby created. For example, if a change is subsequently made in the execution or verification processing, the entire set of affected test cases must be found and revised. In accordance with some embodiments of the invention, maintenance of a test case is localized to a single place in an automation stack, enabling test cases to be nearly maintenance-free.

In a typical test case, code directed to execution of the test case and code directed to determining the results of the execution (verification code) is hard-coded into the test case itself. Often the execution code is mixed in with the verification code. In accordance with some embodiments of the invention, verification processing and details of execution processing are separated from each other and from the test case.

Often test cases do not distinguish between the operations a test is testing and the steps it takes to invoke those actions. An explicit test is often written for each method of execution. For example, each test may include code for each series of mouse moves, button clicks and keystrokes that must be replicated to invoke the operation being tested. With respect to UI testing, each test may have to keep track of the type of control used by each UI component, identify the specific control used and specify where in the UI hierarchy the control can be found. In accordance with some embodiments of the invention, a test case is written in terms of user actions instead of in terms of execution details. User interface details are thus partitioned from user action details.

Automated test cases are typically very tightly bound to the particular piece of software being tested, that is, a typical test case is coded directly against the object it is testing. For example, automated testing of an application via test cases often directly manipulates the state of the application. Test cases for the automated testing of a user interface (UI) often are written directly to one or more controls of the UI, and identify the control(s) by explicit coding of the name or unique identifier of the control(s) in the test cases. If the control changes (e.g., from a button to a list box, or even from one button (e.g., button 36) to another button (e.g., button 42)), all of the test cases for the UI must be changed.

To address these and other problems, a multi-layered library may be created which is usable from scripted test cases, model-based tests and unit tests. The library may comprise one or more of a physical layer, a logical layer, a verification layer, an execution behavior management layer and a data management layer. The physical layer, logical layer and test cases may comprise an automation stack while the verification, execution behavior and data management layers may be separate but at the same level as the logical layer.

A logical layer may provide a view of the application based on the actions that can be taken (e.g., the action "open a document") rather than the specific details of the user interface (e.g., "open the File menu and click Open, wait for the File Open dialog box to open, enter the name of the file to open, press OK, wait for the File Open dialog box to disappear, wait for the application to open the document and be ready for further input"). The logical layer also abstracts away as much knowledge as practical of the UI, so that tests written to the logical layer do not need to be edited if the UI changes. The logical layer also may introduce variability over the various physical methods of execution, so that a single test written to the logical layer can be executed via the mouse, keyboard, etc. without requiring any changes to be made to the test case.

A physical layer may insulate test cases from the highly specific details of communicating with a particular control, including such details as what a particular control's identification code is, and how that control is accessed (via mouse, keyboard, etc.). The physical layer may provide an object model around the application's UI so that the test has strongly typed access to that UI. The physical layer may also enable the execution method to be defined independently of the control so that just a single object model is required regardless of the number of execution methods.

A verification layer may be independent of and isolated from direct contact to the test case, so that changes to verification processing do not require any changes to be made to the test cases. The verification layer may compare an actual state with an expected state to determine if the test case results were as expected.

An execution behavior management layer may be independent of and isolated from direct contact to the test cases so that changes to availability of execution behaviors or changes to the implementation of any specific behavior can be made with minimal or no changes to the test cases. An execution behavior layer may select one or more appropriate behaviors applicable to the test case. The execution behavior layer may ensure that all possible execution paths are exercised A data management layer may be used by test cases when the test cases require test data. The data management system may provide a centralized store of all test data and allow changes to be made to the test data or the manner in which that data is generated requiring minimal or no changes to the test cases. The data management layer may ensure that all possible data values are exercised.

Each layer may provide (direct) access to the layer below it but a test case can make calls to any layer as necessary. A test case that explicitly verifies menu behavior, for example, may use the logical layer to create a drawing that contains various shapes, and use the physical layer to directly manipulate the menus, and go to the operating system services for result verification. Execution method details may be hidden. A test written to the logical layer may require no changes when switching between execution methods. If test cases are completely isolated from the execution method, a mechanism external to and separate from the test case may be used at compile time or at runtime to specify which execution method should be used for a specific run of the tests.

Exemplary Computing Environment

Figure 1:
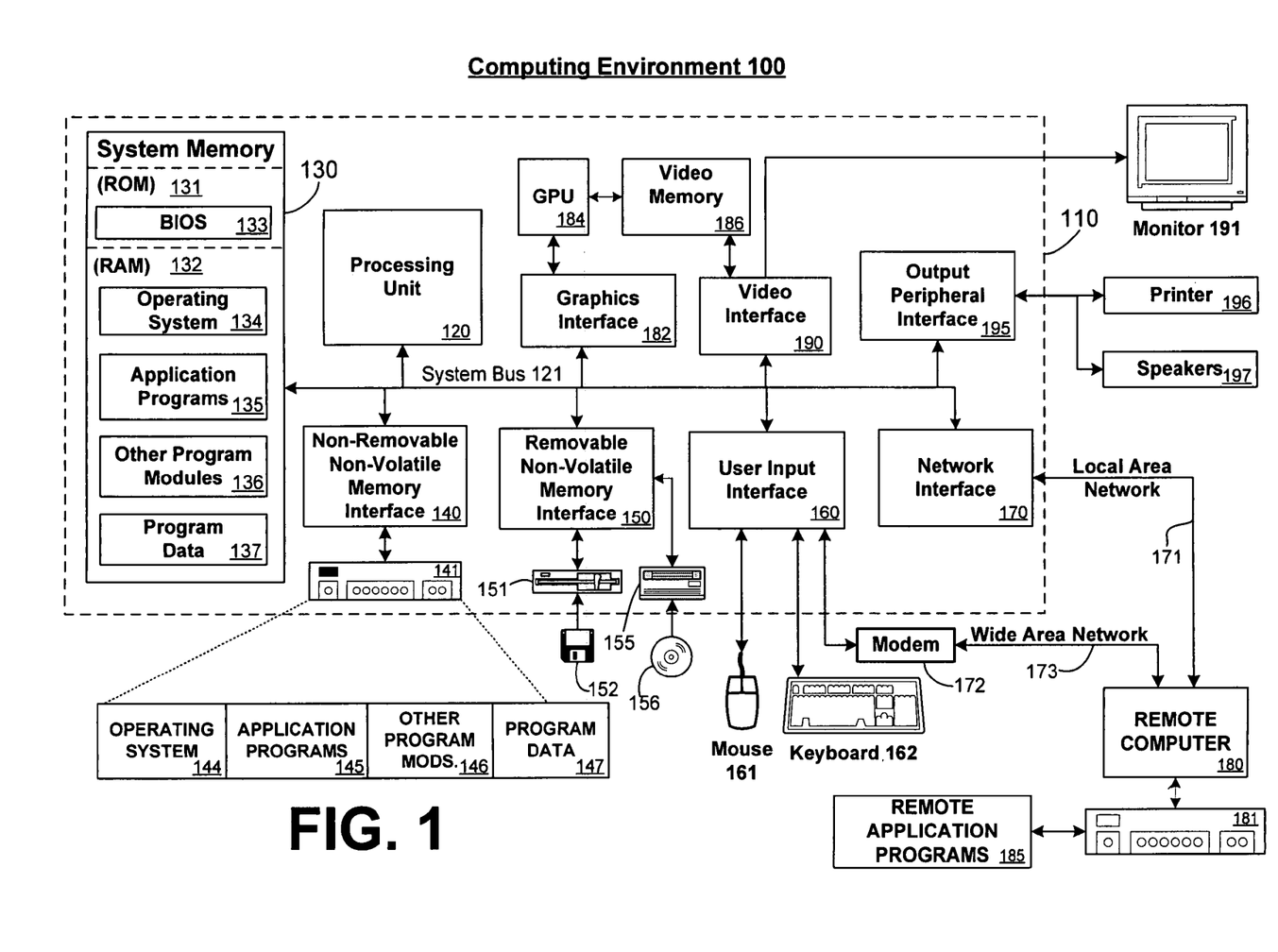
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Automation Stack Layering

In some embodiments of the invention, an application is defined via a logical functional model that takes a user-centric view of the application, in contrast to an object model view or other type of view. Code that is used over and over again may be componentized in a user-centric fashion. For example, actions may be grouped by target: in the logical layer, SceneElements may contain methods that affect the set of elements on the active scene such as Create, Select, Deselect, Cut, Copy, Paste, Delete elements. The Transforms group of methods may have methods to rotate, scale and otherwise apply transforms to scene elements. Path may contain methods to manipulate scene elements that are paths, and so on. In most applications, most of the user actions may be executed in multiple different ways. The infrastructure required for the different execution paths are typically identical. Hence, in some embodiments of the invention, an execution behavior manager is shared across test cases and selects an appropriate behavior (a logical functional model method) for the test case. In some embodiments of the invention, before a test case or logical functional model method executes an operation, a verification manager is notified. The verification manager may save a copy of the complete current state of the application. This copy forms the basis of the expected state when the operation is complete. In some embodiments of the invention, the test case executes a sequence of actions with no knowledge of how the actions are executed or verified.

Figure 2:
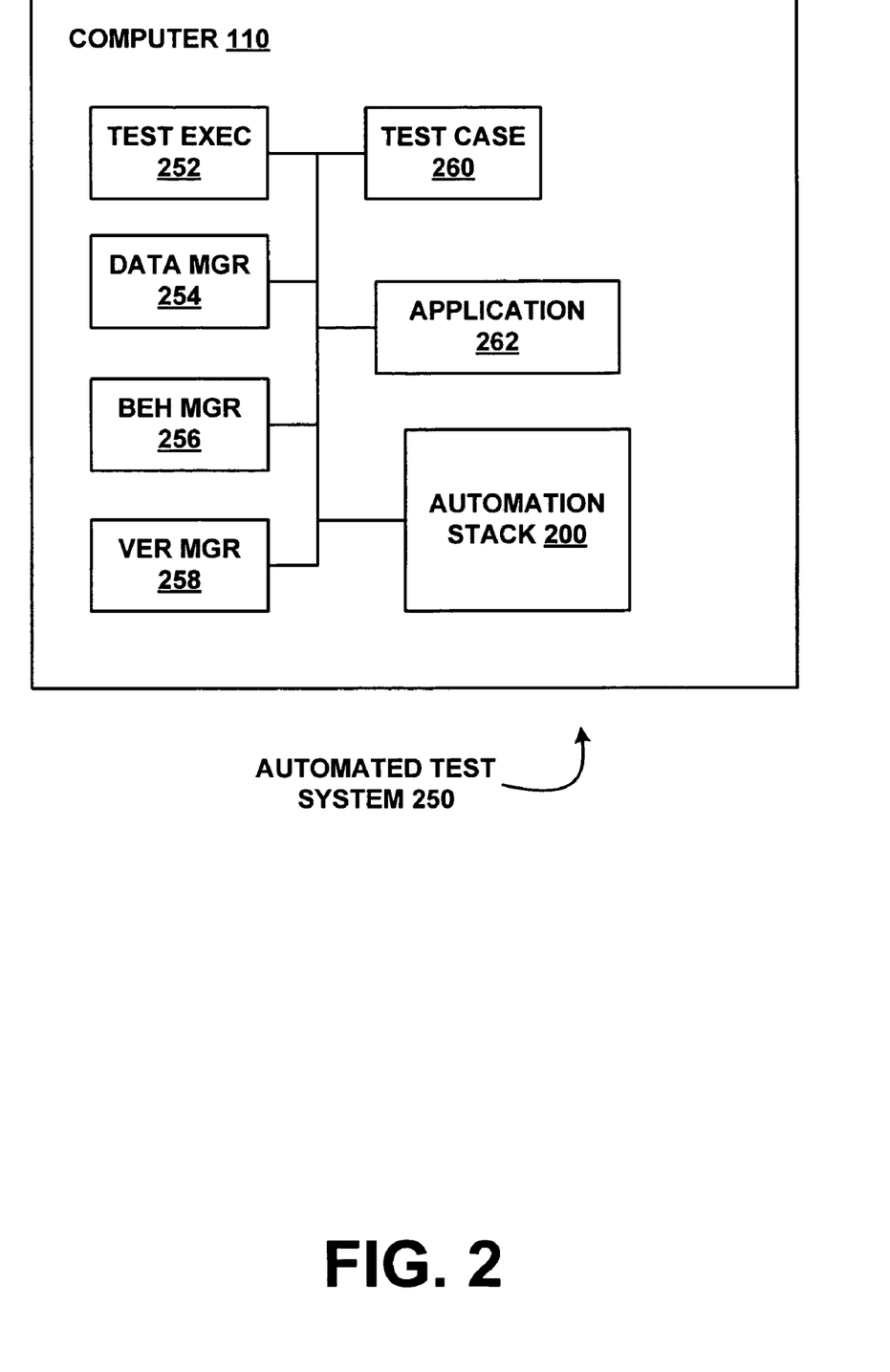
FIG. 2 is a block diagram of an exemplary system for automated software testing using a layered architecture in accordance with one embodiment of the invention.

FIG. 2 is a block diagram illustrating an exemplary automated test system using a layered architecture in accordance with one embodiment of the invention. The automated test system of FIG. 2 may enable efficiencies in test case creation and maintenance such that more comprehensive testing can be done using fewer test cases. The test cases may be easier to create, easier to maintain and easier to understand.

The automated test system 250 may reside on one or more computers, such as exemplary computer 110 described with respect to FIG. 1. Automated test system 250 may include one or more of: a test executor 252, a data manager 254, a behavior manager 256 and associated databank of behaviors (not shown), a verification manager 258, and an automation stack 200. A test executor 252 may execute a test case 260 against an application 262. A data manager 252 in some embodiments of the invention, may provide test data required by the test case 260. The data manager may provide access to a centralized store of all test data and allow changes to be made to the test data or the manner in which the test data is generated requiring minimal or no changes to the test cases.

A behavior manager 256 may select an appropriate behavior for a test case 260 from a databank of behaviors. A verification manager 258 may provide verification of results of executing the test case 260.

Figure 3:
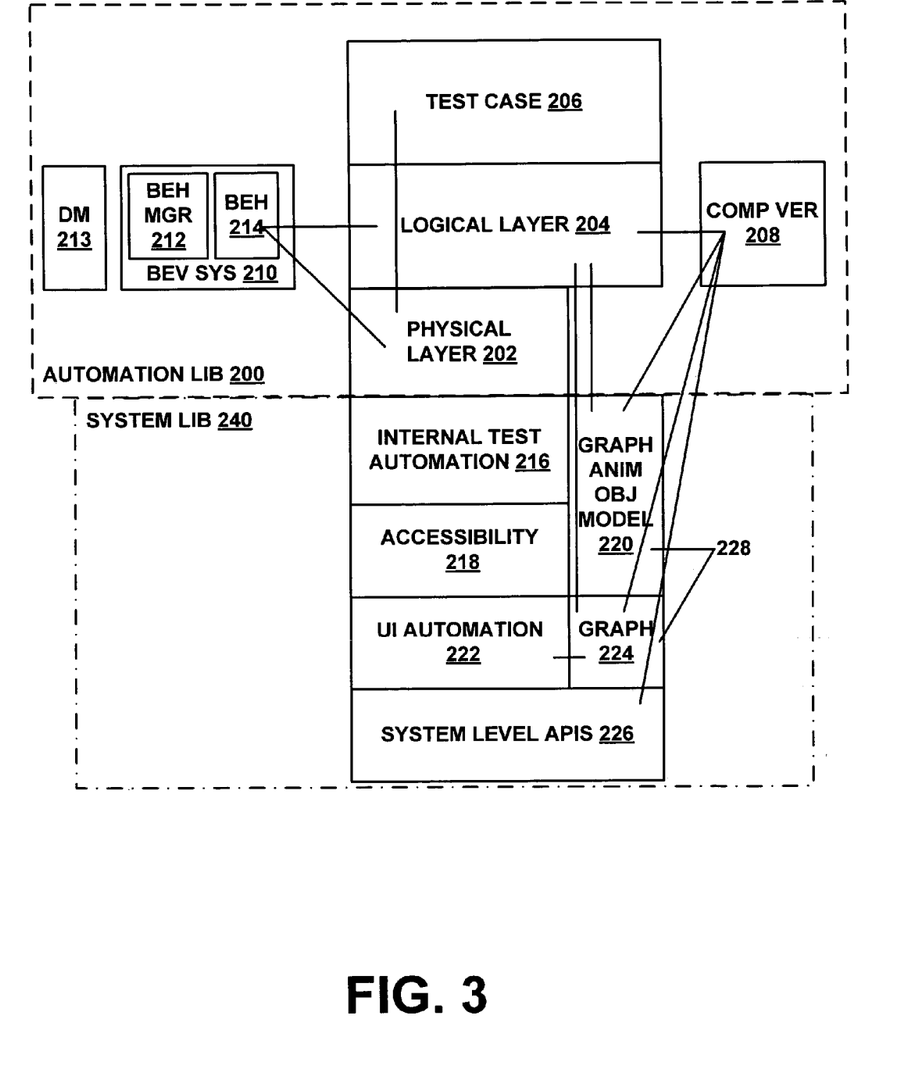
FIG. 3 is a more detailed block diagram of a portion of the system of FIG. 2 in accordance with one embodiment of the invention.

FIG. 3 is a block diagram illustrating an exemplary layered architecture of an automation stack of an automated test system in accordance with one embodiment of the invention.

FIG. 3 is a more detailed block diagram of a portion of the system of FIG. 2. In FIG. 3, the automation library 200 may comprise one or more layers. Each layer of automation library 200 may include one or more sets of objects. The layers of automation library 200 may include one or more of: a physical layer 202, a logical layer 204, one or more test cases in a test case layer 206, a comprehensive verification layer 208, a behavior layer 210 and a data manager layer 213. The behavior layer 210 may comprise an execution behavior manager 212 and execution behavior databank 214. Alternatively, execution behaviors may reside in the logical layer 204.

The automation library 200 may include one or more of the physical layer 202, the logical layer 204, and one or more test cases in test case layer 206, while the execution behavior layer 210, the comprehensive verification layer 208 and the data manager layer 213 may exist external to the automation architectural stack 230. In some embodiments of the invention the execution behavior layer 210, the comprehensive verification layer 208 and the data manager layer 213 although separate from the logical layer 204, are integrated into the logical layer 204. Because the execution behavior layer 210, the comprehensive verification layer 208 and the data manager level 213 are separate from the logical layer 210, the execution behavior layer 210, the comprehensive verification layer 208 and the data manager level 213 can be accessed from outside the architectural stack.

Automation library 200 may represent a layer over a system library comprising one or more components including, for example, one or more of: an operating system, external tools, a graphics animation subsystem, etc. In FIG. 2, an exemplary system library 240 includes an internal test automation module 216, an accessibility module 218, a UI automation module 222, a graphics animation subsystem 228 (comprising a graphics animation object model 220 and a graphics animation application 224), and system level applications.

The automation library 200 may include the layout and controls of a graphics animation subsystem 228. The layout portion of automation library 200 may include classes for each instance of visual element of the graphics animation subsystem 228. That is, the layout portion may include all the classes which represent the "top-level" visual elements of the graphics subsystem 228, such as but not limited to: a new project dialog, one or more toolbox panes and a main menu. The controls portion may include classes for each type of visual element. That is, the controls portion may include classes for all system and custom controls used with the graphics animation subsystem, such as, but not limited to: a button class, a combo box class, a text box class and a color picker class. These controls may be accessible only through top-level elements (e.g., through the main menu, a toolbox pane or the new project dialog). Each control in the controls portion of the automation library 200 may include all the methods and properties required to access and manipulate the control, including implementations for all input methods (e.g., via keyboard, mouse, accessibility, etc.).

The automation library 200 may be used to conduct any type of tests including model-based, integration, performance, load, stress, acceptance, unit, build verification, basic functionality, exit criteria, comprehensive/extended functionality, localization, globalization, accessibility and other tests. The automation library 200 may be accessed by or include test cases which are scripted. Alternatively, test cases accessing or included in automation library 200 may be represented in XML, in a compiled language, in byte code, in a database, in text, in a table, or so on.

Each layer of the automation library 200 has direct access to (can make calls to) the layer below. That is, the test case layer 206 has direct access to the logical layer 204. The logical layer 204 has direct access to the physical layer 202 and so on. In some embodiments of the invention, means are provided for a layer to access or make calls to a deeper layer, that is, for example, it may be possible for a test case to directly access the internal test automation layer 216, the physical layer 202 and so on, in the event that it desirable to do so.

Test cases layer 206 may include one or more test cases to be applied to an application or module, feature or function to be tested. A test case may be scripted. An exemplary test case written to the logical layer 204 may be, for example:
Start Graphics Animation Subsystem
Add a new Project
Draw a rectangle from 0,0 to 4,4
Set the color of the rectangle to red
Save the project
Shut down the Graphics Animation Subsystem It will be appreciated that missing from the above exemplary test case is code directed to verification of results, code directed to execution options, code directed to identifying particular UI elements such as controls and so on. A test case of test case layer 206 written to the logical layer 204 should thus rarely need to change because of changes in the automation library 200 due to the encapsulation of the logical operations of the application.

In some embodiments of the invention, the logical layer 202 is directed to the functions the application is supposed to perform rather than on how the operations of each function are implemented. The logical layer 202 may encapsulate or wrap the logical operations of the graphics animation subsystem 228, abstracting the implementation specifics of the logical operations. In some embodiments of the invention, the logical layer 202 abstracts away all knowledge of the UI and provides the interface between the test case of the test case layer 206 and the verification layer 208, the behavior layer 210 and the data manager layer 213. The logical layer 202 may also provide an interface between the graphics animation object model 220 (the internal state of the graphics animation application 224) and the test case. The logical layer may provide variability over the sequence of actions used to execute a single user action.

The physical layer 202 abstracts the execution methods so that test cases written to the physical layer do not have to address execution details such as whether a control is invoked by using a mouse, or keyboard, accessibility software, etc. The physical layer may provide variability over the method used to interact with a particular control. The physical layer 202 also may provide an object model around the UI, that is, the physical layer 202 may provide an interface to the UI. Hence, when elements in the application or UI change, changes can be made in the physical layer rather than in all the test cases.

Another exemplary test case written to the physical layer may be, for example:
Start Graphics Animation Subsystem
Invoke the File menu
Invoke the New submenu
Invoke the New Project menu item
Type the name to give the new project
Close the New Project dialog box
Wait for the Graphics Animation Subsystem to finish creating the new project
Activate the rectangle shape tool
Drag the mouse from 0,0 to 4,4

Select "Red" from the list of possible stroke colors in the color-properties pane
  Invoke the File menu
  Invoke the Save menu item
  Wait for the Graphics Animation Subsystem to finish saving the project
  Invoke the File menu
  Invoke the Exit menu item
  Wait for the Graphics Animation Subsystem to shut down It will be appreciated that the above exemplary test case does not specify how the actions (e.g., "Invoke the File menu") are carried out (i.e., does not specify the execution path). Because the execution manager selects from a universe of possible execution paths, running the test case a number of times will execute all the available execution paths multiple times. Because all verification code resides outside of the test case, verification processing can be made more complete without needing to change the test case. Similarly, the test case will not need to change if the expected results of any of the actions it includes changes. It will be appreciated that the test case contains no references to any UI. Hence, the test case will not need to change if the UI changes. It will be appreciated that the test case is focused on actions a user might take.

Corresponding code in the physical layer to which the test code is written may be as follows:

```
class UIPane
{
    UIButton Minimize {
    return new UIButton("idOfTheMinimizeButton"); }
    UIButton Restore {
    return new UIButton("idOfTheRestoreButton"); }
    UIButton Close {
    return new UIButton("idOfTheCloseButton"); }
}
class UIColorPane derives from class UIPane
{
    UIComboBox AvailableColorsForFill { return new
UIComboBox("idOfTheAvailableFillColorsComboBox"); }
    UIColorPicker CustomColorsForFill { return new
UIColorPicker("idOfTheCustomFillColorColorPicker"); }
    UIComboBox AvailableColorsForStroke { return new
UIComboBox("idOfTheAvailableStrokeColorsComboBox"); }
    UIColorPicker CustomColorsForStroke { return new
UIColorPicker("idOfTheCustomStrokeColorColorPicker"); }
}
class UIButton
{
    Area boundingBox;
    UIButton(identifier)
    {
        GraphicsSubsystem.Control control =
GraphicsSubsystem.FindControl(identifier);
        boundingBox = control.BoundingBox;
    }
    Invoke( )
    {
    ScreenCoordinate clickPoint;
    clickPoint.x = boundingBox.Left + (boundingBox.Width / 2);
    clickPoint.y = boundingBox.Top + (boundingBox.Height /2);
    Mouse.Move(clickPoint);
    Mouse.Click( );
    }
}
```

Because the logical layer 204 is concerned only with functionality and not with implementation details, and because most test cases are written to the logical layer 204, test cases may be written far earlier in the software life cycle. As soon as the code is complete, the test cases may be run, thus more testing can be done sooner and faster.

A comprehensive verification layer 208 in some embodiments of the invention encapsulates verification processing. The logical layer 204 in some embodiments of the invention notifies the verification layer 208 before the logical layer 204 executes the test case to enable the verification layer 208 to take a snapshot of the pre-test state. After the test case is executed, the logical layer 204 notifies the verification layer 208 that the test case has been executed. The verification layer 208 may then determine if the actual results coincide with the expected results. Further information concerning the verification layer may be found in the related application, U.S. patent application Ser. No. 10/953,437, entitled "Automated Test Case Verification That Is Loosely Coupled With Respect To Automated Test Case Execution."

The logical layer 204 in some embodiments implements a specific behavior (of execution behaviors 214) for each method of implementing a logical operation. For example, in some embodiments of the invention, for a CreateNewProject behavior, this will include implementing the application's object model, sending a sequence of keystrokes, invoking a menu item via an accessibility module, invoking the menu item using the mouse, invoking the menu item using the arrow keys to navigate around the menu and invoking the menu item using the mnemonic characters to navigate around the menus. The execution behavior layer may determine which behaviors are relevant to the logical operation.

In some embodiments of the invention, a separate behavior (stored in execution behaviors databank 214, in the logical layer 204 or elsewhere) may be implemented for each method implementing a logical operation. The use of behaviors makes it possible to write far fewer test cases while still providing the same degree of comprehensive testing. The execution behavior manager 212 of the execution behavior layer 210 in some embodiments of the invention determines which behaviors stored in execution behavior databank 214 are relevant to the logical operation under consideration. In some embodiments of the invention, weighting factors and other settings may be used to select a particular behavior. Further information concerning the behavior layer 210 may be found in related application U.S. patent application Ser. No. 10/953,238, entitled "System for Selecting Test Case Execution Behaviors for Reproducible Test Automation."

The logical layer 204 may then execute the operation using the selected behavior. The selection mechanism in some embodiments of the invention is configurable at run-time. This feature enables test behavior to be modified without modifying the test cases themselves. For example, if the menuing mechanism has recently been re-written, it may be desirable to perform actions using the menuing mechanism in order to give the new code a good test. Alternatively, if there is a known bug in the shortcut key processing, it may be desirable to refrain from using a method that uses shortcut keys until the bug is fixed. This change may be made via the behavior layer rather than in the test case itself.

Figure 4:
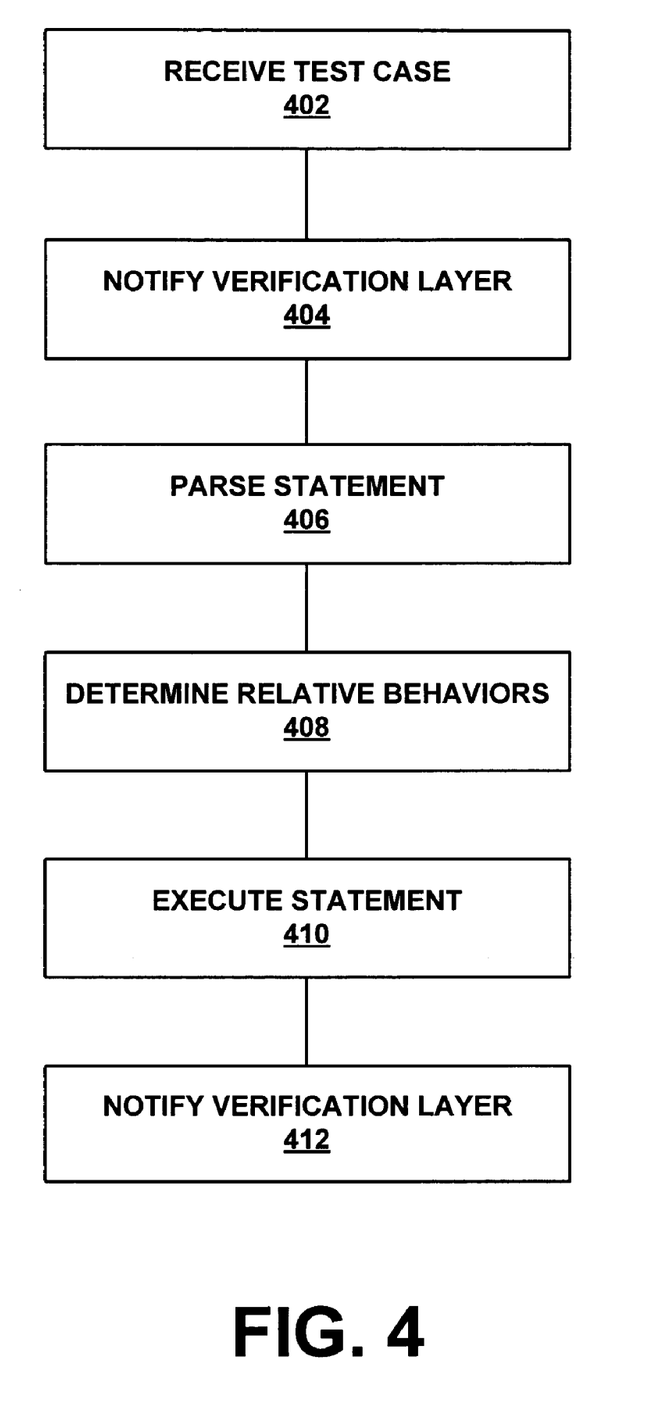
FIG. 4 is a flow diagram of an exemplary method for using the automated software testing system of FIG. 2 in accordance with one embodiment of the invention.

FIG. 4 is a flow diagram of a method of using the architectural stack in automated testing. At step 402 a test case written to the architectural stack is received. The test case may be written to the logical layer. Alternatively, the test case may be written to a layer deeper in the stack. At step 404 a notification may be sent to the verification layer that the test case will be executed. In some embodiments of the invention, a snapshot of the pre-test expected state of the application to be tested is taken. At step 406 a statement of the test case is parsed. In some embodiments of the invention, each statement of the test case represents a logical operation. At step 408, the behaviors relevant to the logical operation are determined. Rather than implementing the details of each step itself, the test cases may ask the execution behavior manager for an appropriate behavior. In some embodiments of the invention, the execution behavior manager of the execution behavior layer determines which behaviors in the execution behaviors databank are relevant to the logical operation under consideration. The execution behavior manager may look through the set of relationships between the individual behaviors that can be used to implement the step in the test case and may make a selection. Weighting factors and other settings may be used to select a particular behavior. At step 410 the operation may be executed using the selected behavior. Steps 406 through 410 may be repeated for each statement in the test case. At step 412 the verification layer may be notified that the test case has executed. The verification layer may determine if the actual results coincide with the expected results. Alternatively, the verification processing may occur after each statement in the test case executes.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. An automated test system for testing a software application, the system comprising a processor and configured to:
   receive a test case, the test case comprising at least one statement, the at least one statement referencing an object in a logical layer of a multi-layered library, the object being associated with a user action of the software application, the user action comprising a general action a user may take with regard to the software application and without regard to any specific set of execution details employed to implement the user action, each user action being implemented by any of a plurality of sets of specific execution details, each set of specific execution details setting out a corresponding execution path of user commands;
   select a behavior associated with the user action, the behavior also being associated with a specific execution path for the user action; and
   execute the test case using the selected specific execution path, the selected specific execution path referencing an object in a physical layer of the multi-layered library, the object in the physical layer corresponding to the object in the logical layer and comprising a set of specific execution details relating to the user action of the corresponding object in the logical layer and to the selected specific execution path.

2. The system of claim 1, further configured to send a notification that the test case will be executed.

3. The system of claim 1, further configured to save a pre-test expected state resulting from execution of the test case.

4. The system of claim 3, further configured to compare the pre-test expected state resulting from execution of the test case with an actual post-test state resulting from execution of the test case.

5. The system of claim 1, wherein the test case comprises no execution options.

6. The system of claim 1, wherein the test case resides in a test case layer of a test automation stack.

7. The system of claim 1, further comprising a data manager, the data manager providing variable test data required by a test case.

8. The system of claim 1, wherein objects associated with test data selection are stored in a second logical layer not in a test automation stack.

9. The system of claim 1, further comprising a behavior manager, the behavior manager selecting execution options for a test case.

10. The system of claim 1, wherein objects associated with verification of test results are separated from objects associated with execution options.

11. The system of claim 1, wherein an object associated with an execution path for a user action of the set of user actions of the application to be tested is stored in a logical layer of a test automation stack.

12. The system of claim 1, further comprising a verification manager, the verification manager determining results of execution of a test case.

13. The system of claim 1, wherein objects associated with verification of test results are separated from objects associated with execution options.

14. The system of claim 1, wherein an object associated with verification of test results is stored in a logical layer of a test automation stack.

15. The system of claim 12, wherein the verification manager compares actual results of execution of the test case with expected results of execution of the test case.

16. A method for testing a software application and comprising: receiving a test case, the test case comprising at least one statement, the at least one statement referencing an object in a logical layer of a multi-layered library, the object being associated with a user action of the software application, the user action comprising a general action a user may take with regard to the software application and without regard to any specific set of execution details employed to implement the user action, each user action being implemented by any of a plurality of sets of specific execution details, each set of specific execution details setting out a corresponding execution path of user commands;
   selecting a behavior associated with the user action, the behavior also being associated with a specific execution path for the user action; and executing the test case using the selected specific execution path, the selected specific execution path referencing an object in a physical layer of the multi-layered library, the object in the physical layer corresponding to the object in the logical layer and comprising a set of specific execution details relating to the user action of the corresponding object in the logical layer and to the selected specific execution path.

17. The method of claim 16, further comprising:
sending a notification that the test case will be executed.

18. The method of claim 16, further comprising:
saving a pre-test expected state resulting from execution of the test case.

19. The method of claim 18, further comprising:
comparing the pre-test expected state resulting from execution of the test case with an actual post-test state resulting from execution of the test case.

20. The method of claim 16, wherein objects associated with verification of test results are separated from objects associated with execution options.

21. A computer-readable storage medium having stored thereon computer executable instructions for implementing a method for creating efficiencies in test case creation and maintenance for testing a software application and comprising:
receiving a test case, the test case comprising at least one statement, the at least one statement referencing an object in a logical layer of a multi-layered library, the object being associated with a user action of the software application, the user action comprising a general action a user may take with regard to the software application and without regard to any specific set of execution details employed to implement the user action, each user action being implemented by any of a plurality of sets of specific execution details, each set of specific execution details setting out a corresponding execution path of user commands;
sending a notification that the test case will be executed;
selecting a behavior associated with the user action, the behavior also being associated with a specific execution path for the user action; and
executing the test case using the selected specific execution path, the selected specific execution path referencing an object in a physical layer of the multi-layered library, the object in the physical layer corresponding to the object in the logical layer and comprising a set of specific execution details relating to the user action of the corresponding object in the logical layer and to the selected specific execution path; and
comparing a pre-test expected state with a post-test actual state.

22. The computer-readable storage medium of claim 21, comprising further instructions for:
saving a pre-test expected state resulting from execution of the test case.

23. The computer-readable storage medium of claim 22, comprising further instructions for:
comparing the pre-test expected state resulting from execution of the test case with an actual post-test state resulting from execution of the test case.

24. The computer-readable storage medium of claim 21, comprising further instructions for:
parsing the test case.

25. The computer-readable storage medium of claim 21, comprising further instructions for:
sending a notification that the test case has been executed.

\* \* \* \* \*

UNITED STATES PATENT AND TRADEMARK OFFICE
CERTIFICATE OF CORRECTION

PATENT NO. : 7,398,514 B2  
APPLICATION NO. : 10/953402  
DATED : July 8, 2008  
INVENTOR(S) : Adam M. Ulrich et al.

Page 1 of 1

It is certified that error appears in the above-identified patent and that said Letters Patent is hereby corrected as shown below:

In column 16, line 18, in Claim 4, after "from" insert -- the --.

Signed and Sealed this
Nineteenth Day of April, 2011

David J. Kappos
*Director of the United States Patent and Trademark Office*